(12) United States Patent
Zubiaurre Lodoso

(10) Patent No.: US 9,821,387 B2
(45) Date of Patent: Nov. 21, 2017

(54) MACHINE FOR BREAKING A CONNECTING ROD

(75) Inventor: Luis Maria Zubiaurre Lodoso, Elgoibar (ES)

(73) Assignee: GAINDU, S.L., Elgoibar (Guipuzcoa) (ES)

( * ) Notice: Subject to any disclaimer, the term of this patent is extended or adjusted under 35 U.S.C. 154(b) by 619 days.

(21) Appl. No.: 14/343,121

(22) PCT Filed: Sep. 6, 2011

(86) PCT No.: PCT/ES2011/070626
§ 371 (c)(1),
(2), (4) Date: Aug. 11, 2014

(87) PCT Pub. No.: WO2013/034782
PCT Pub. Date: Mar. 14, 2013

(65) Prior Publication Data
US 2014/0346211 A1 Nov. 27, 2014

(51) Int. Cl.
*B23D 31/00* (2006.01)

(52) U.S. Cl.
CPC ......... *B23D 31/002* (2013.01); *B23D 31/003* (2013.01); *Y10T 225/371* (2015.04)

(58) Field of Classification Search
CPC .... B23D 31/003; B23D 31/002; B23D 31/00; Y10T 225/371; Y10T 29/49218; B26F 3/02; F01N 5/02; F02M 27/02; F16B 7/14
USPC ... 225/103, 96.5, 97.96, 100, 101, 104, 105, 225/93, 2, 94.1, 413, 416; 29/888.09, 29/413, 416, 882, 426.5, 426.4, 888.091
See application file for complete search history.

(56) References Cited

U.S. PATENT DOCUMENTS

| | | | | |
|---|---|---|---|---|
| 5,163,791 A * | 11/1992 | Norton | .................... | B23B 47/28 408/72 R |
| 5,169,046 A * | 12/1992 | Miessen | ............... | B23D 31/003 225/100 |
| 5,320,265 A * | 6/1994 | Becker | ................. | B23D 31/003 225/104 |
| 6,457,621 B1 * | 10/2002 | Hahnel | ................ | B23D 31/003 225/100 |

(Continued)

FOREIGN PATENT DOCUMENTS

| DE | 19841027 | 3/2000 |
|---|---|---|
| DE | 19918067 | 10/2000 |

(Continued)

OTHER PUBLICATIONS

International Search Report for corresponding application PCT/ES2011/070626 filed Sep. 6, 2011; dated Aug. 17, 2012.

(Continued)

*Primary Examiner* — Ghassem Alie
(74) *Attorney, Agent, or Firm* — Cantor Colburn LLP

(57) ABSTRACT

Machine for cracking a connecting rod having a small end and a big end, into a rod part and a cap part, the machine including positioning elements for positioning the connecting rod in a position for cracking, and an expandable element arranged to be inserted into a bore in said big end of the connecting rod so as to allow for splitting of the connecting rod into a rod part and a cap part by expanding the expandable element, where the machine further includes an electro press with a servomotor for actuating the expandable element.

23 Claims, 11 Drawing Sheets

(56) References Cited

U.S. PATENT DOCUMENTS

| | | | |
|---|---|---|---|
| 6,474,526 B1 * | 11/2002 | Hahnel | B23D 31/003 225/100 |
| 6,671,955 B2 | 1/2004 | Hugler | |
| 2002/0023939 A1 * | 2/2002 | Hase | B23D 31/003 225/2 |
| 2005/0044706 A1 * | 3/2005 | Momose | B23D 31/003 29/888.09 |
| 2008/0011801 A1 * | 1/2008 | Okumura | B23D 31/003 225/2 |
| 2011/0219931 A1 * | 9/2011 | Heo | G02B 6/0038 83/875 |

FOREIGN PATENT DOCUMENTS

| | | | | |
|---|---|---|---|---|
| DE | 10137975 A1 | 2/2003 | | |
| EP | 0467198 | 1/1992 | | |
| EP | 0568119 | 11/1993 | | |
| EP | 2329944 | 6/2011 | | |
| GB | 856650 A * | 12/1960 | | B30B 15/26 |
| JP | 2003 013906 A * | 6/2001 | | F15B 11/00 |
| JP | 2001150193 | 6/2001 | | |
| WO | 02090028 A1 | 11/2002 | | |
| WO | 2013034782 A1 | 3/2013 | | |

OTHER PUBLICATIONS

International Preliminary Report on Patentability for corresponding application PCT/ES2011/070626 filed Sep. 6, 2011; dated Dec. 20, 2012.
European Search Report for corresponding application EP14169046; Report dated Oct. 17, 2014.

* cited by examiner

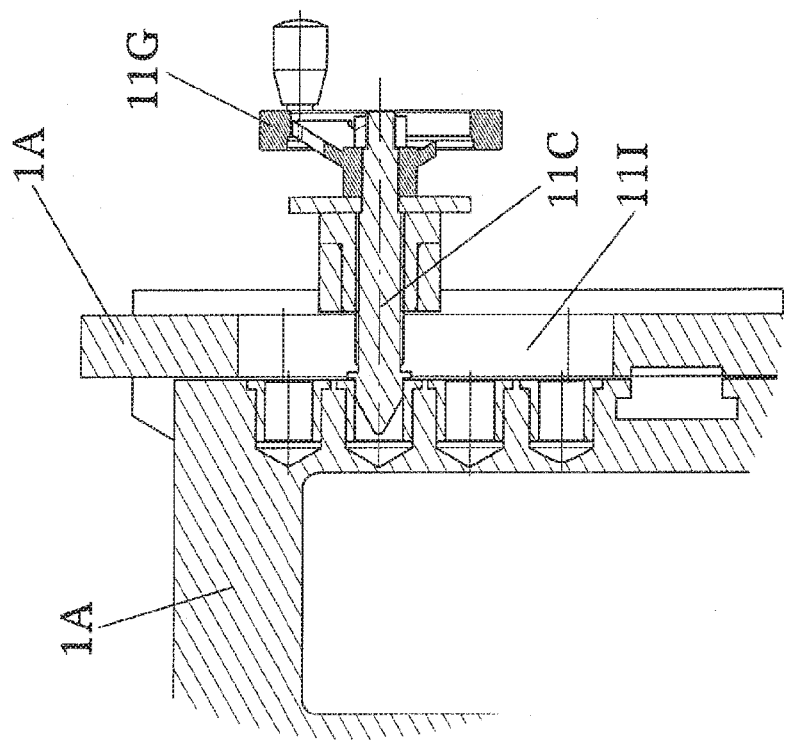
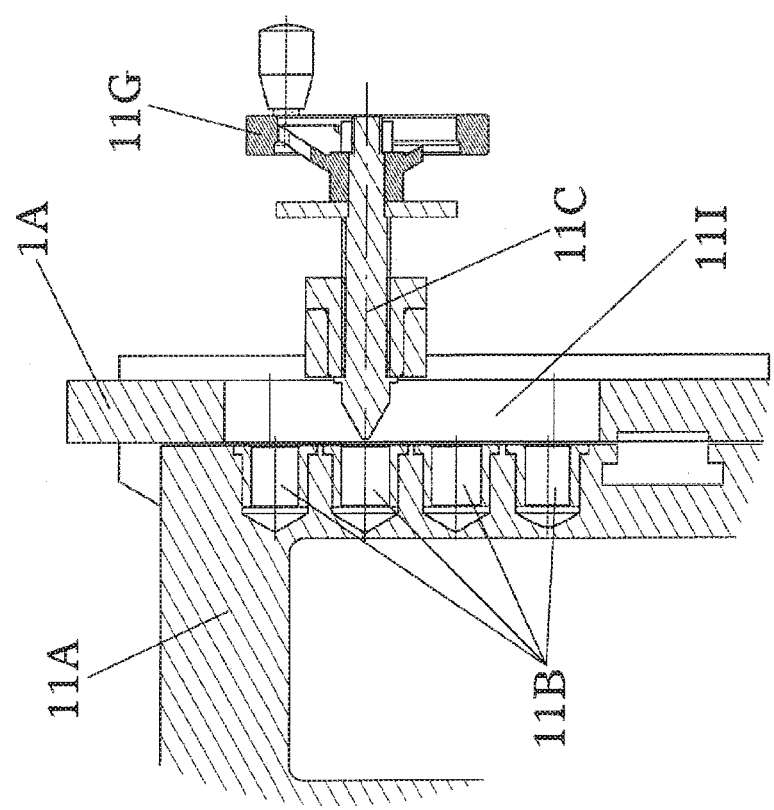
FIG. 8A
FIG. 8B

MACHINE FOR BREAKING A CONNECTING ROD

TECHNICAL FIELD

The invention is related to machines and methods for the production of connecting rods (also known as conrods), and especially to the machines for performing cracking of the big end of the rods, and related actions.

BACKGROUND

In internal combustion engines for automobiles, the connecting rod is used to connect the piston to the crankshaft. The connecting rods are usually made of metal, such as steel, although also other materials can be used, for example, to achieve a desired lightness. A connecting rod typically has a small end with a small bore, and a big end with a big bore. The small end attaches to the piston pin or similar, and the big end typically connects to the crankshaft.

FIG. 1 illustrates a typical design of a connecting rod. The connecting rod 1000 comprises what will hereinafter be referred to as a rod portion or rod 1001 (comprising the stem portion 1004 and the small end 1003 in which the small bore 1005 is formed, as well as part of the big end in which the big bore 1006 is formed), and a cap 1002 which, together with the big end of the rod 1001, defines the big bore 1006. The cap 1002 is attached to the rod by screws 1007 which are screwed into corresponding bores. The joint 1008 between rod 1001 and cap 1002 is often hardly visible on the finished rod.

The connecting rod is obtained by machining a blank in the form of a single metal piece so as to produce a rod blank comprising both the small end with the small bore and the big end with the big bore. This rod blank is subsequently split into the rod 1001 and the cap 1002. This operation is normally referred to as "cracking" of the rod, an operation which is normally performed by introducing an object, such as two expander mandrel parts, into the big bore 1006, and separating these two mandrel parts using, for example, a wedge element. Before performing the actual cracking, the big end has been "notched" by, for example, laser or other suitable means, so as to establish notches that define the plane where the big end will split during separation of the two expander mandrel parts.

Due to the fact that the cap 1002 and rod 1001 are separated from each other by actually "cracking" the metal (instead of, for example, by cutting or other means, or instead of producing rod and cap from two separate blanks), the surfaces where rod and cap are connected to each other fit very well together, once the rod and cap have been reassembled to form the connecting rod.

Cracking rod blanks is conventional in the art of manufacture of connecting rods.

For example, DE-19841027-C1 describes a machine used for cracking rods. A laser is used to produce the notches that define the plane of cracking. Cracking is performed by using what appears to be two expander mandrel halves, which expand due to the movement of a wedge element. The machine further comprises means for screwing the cap onto the rod.

U.S. Pat. No. 6,457,621-B1 teaches a device for separating rod and cap of a connecting rod, by means of cracking the big end using two expander mandrel halves and a cleaving wedge. The device comprises a fixed device half and a movable device half. U.S. Pat. No. 6,457,621-B1 describes extensively how the rod blank can be fixed in its position during the operation.

Also DE-9320463-U1, EP-568119-A1 and EP-467198-A1 describe different arrangements for cracking connecting rods.

U.S. Pat. No. 6,671,955-B1 describes a method for treating a connecting rod after cracking, by applying a vibration treatment. The crack surfaces are in contact during the vibration treatment.

BRIEF SUMMARY

The invention relates to a machine for cracking a connecting rod (or a rod blank, that is, a blank that has been machined to feature many of the characteristics of the final product, but with the cap and rod still forming part of the same metal body) having a small end and a big end, into a rod part and a cap part, said machine comprising:

positioning elements for positioning said connecting rod in a position for cracking; and an expandable element arranged to be inserted into a bore in said big end of the connecting rod so as to allow for splitting of said connecting rod into a rod part and a cap part by expanding said expandable element.

The machine further comprises an electro press with a servomotor for actuating the expandable element, for example, for displacing a cleaving wedge to separate two mandrel halves. Some advantages involved with the use of an electro press are explained below.

In some embodiments of the invention, the machine comprises a first part and a second part, said second part being movable with regard to said first part. Said first part can, for example, be a fixed part, fixed in relation to a frame of the machine; the second part can then be mounted so that it is movable with respect to said fixed part, for example, along guide rails or similar. For example, the second part can be a carriage linearly moveable with regard to the first part, for example, in the horizontal plane, between a proximal position and a distal position with regard to said first part. The proximal position can be the position when the connecting rod is mounted in the machine, before the cracking operation begins, and the distal position can correspond to a position at the end of the cracking operation, when cracking has taken place and the cap part has been separated from the rod part.

Said first part is arranged to accommodate a cap portion of said big end of said connecting rod, and said first part further comprises first positioning elements arranged to interact with said cap portion. These positioning elements can serve to determine, or contribute to determine, or fix, the position of the big end of the connecting rod with regard to the first part of the machine; for example, these first positioning elements can be in line with the pins taught by U.S. Pat. No. 6,457,621-B1 or DE-9320463-U1.

Said second part is arranged to accommodate the small end of said connecting rod, and said second part further comprises at least one second positioning element arranged to interact with the small end of the connecting rod. This second positioning element can, for example, include a pin, a protuberance or similar arranged to be positioned within the small bore of the small end of the connecting rod, thereby impeding or limiting the movement of the small end of the connecting rod in relation to this pin.

The machine further comprises an expandable element arranged to be inserted into a bore in said big end of the connecting rod so as to allow for splitting of said connecting rod into a rod part and a cap part by expanding said expandable element. Said second part is basically displaceable with regard to said first part so that after splitting of said connecting rod, the cap part is retained in said first part and the rod part moves with said second part, away from said cap part. The expandable element can typically be composed in the conventional way, that is, comprising two expander mandrel halves arranged to be separated by a cleaving wedge. One of the expander mandrel halves can be attached to the first part and the other expander mandrel part can be connected to the second part of the machine.

According to these embodiments of the invention, said second part comprises a first carriage (the term "carriage" is used in a generic sense and should not be interpreted to imply any limitation in what regards the design and layout of the carriage) which is arranged to be movable with regard to said first part between a proximal position and a distal position, and a second carriage which is arranged to be (for example, linearly) movable with regard to said first carriage, said second positioning element being provided on said second carriage so as to set (or determine, or fix) the position of the small end of said connecting rod with regard to said second carriage.

That is, the position of the small end of the connecting rod is substantially fixed with regard to the second carriage during operation of the device, while it can move with regard to the first carriage and, of course, also with regard to the first part of the machine. Due to the use of two carriages with the possibility of relative movement between them, a certain movement of the second carriage, on which the small end of the connecting rod is positioned, with respect the first carriage, is possible. Thereby, it is possible to prevent or reduce forces and stresses that may appear on the stem or rod part of the connecting rod during cracking. That is, having the small end of the rod arranged in a floating manner with regard to the first carriage can be advantageous. For example, when the expandable element starts to expand, it can force the first carriage to move, which could give rise to stresses in the connecting rod if the small end of the connecting rod were not arranged in a floating manner with regard to said first carriage. For example, if one of the expander mandrel halves is attached to the first carriage, the first carriage will be forced to move when expansion of the expandable element begins, however, the arrangement of the small end of the connecting rod positioned with regard to the second carriage allows this small end to maintain its position in spite of the movement of the first carriage, during this first part of the operation of the machine, before cracking takes place.

The expandable element can include a first sleeve portion attached to (or integral with, or mounted on, or fixed to, for example, screwed onto) said first part, and a second sleeve portion attached to (or integral with, or mounted on, or fixed to, for example, screwed onto) the first carriage, said first and second sleeve portions being arranged to form, when said first carriage is in said proximal position, a protrusion arranged to fit into a big bore in the big end of the connecting rod. That is, each of said sleeve portions can make up a segment of, for example, a cylinder or similar, such as approximately a 180 degree segment, so that when they are brought together, they form substantially a 360 degree cylinder or sleeve, which penetrates the big bore of the connecting rod when this rod is put into the machine for cracking. On the other hand, part of the expandable element can be arranged within this cylinder or sleeve. For example, when the expandable element comprises two expander mandrel halves, one of these sleeve portions can be arranged in correspondence with—for example, partially surrounding— one of the expander mandrel halves, and the other sleeve portion can be arranged in correspondence with the other expander mandrel half, whereby the sleeve portions can serve to adapt the size of the expandable element to the size of the big bore of a certain type of crankshaft to be introduced into the machine. That is, adaptation of the expandable element to the size of a specific product can be made simply by replacing the sleeve portions, and without any need for replacing the expander mandrel halves.

When the expandable element begins to expand, the sleeve portions will move away from each other and towards the inner surface of the big bore. Thus, these sleeve portions will exert increasing pressure on the inner surface of the big bore, and the continued expansion of the expandable element will end up producing the cracking of the large end of the connecting rod into said cap part and rod part. However, before cracking takes place, and while the second sleeve portion is caused to move due to the expansion of the expandable element, the first carriage of the second part is actually forced away from the first part, as the second sleeve portion (and, if applicable, a corresponding expander mandrel half) is attached to this first carriage. Thereby, if the small end of the connecting rod were fixed directly to this first carriage, stresses could occur that could eventually cause some damage to the connecting rod, for example, to its stem. However, as the small end of the connecting rod is positioned with regard to the second carriage, which is displaceable with regard to the first carriage in a direction parallel with the direction of movement of the first carriage, these stresses can be avoided, as the first carriage does not force the small end of the connecting rod to travel away from the first part during this stage of the movement of the first carriage. That is, the floating arrangement of the small part of the connecting rod can be advantageous and reduce the risk of damages to the connecting rod during, for example, the initial part of the cracking operation. In the present context, the term "sleeve portion", "sleeve", "cylinder", etc., should not be interpreted in a limited sense, but are used to denote any arrangement which can form a protrusion to be arranged within the big bore and, for example, around the expander mandrel halves. For example, it is not necessary that the sleeve portions or sleeve are completely continuous or completely circular all around their circumference. Also, it is not necessary that the sleeve portions make up 180 degree arc portions. Each sleeve portion can, for example, include flattened portions, and/or it can be made up of a plurality of shorter arc portions that together make up a larger arc portion.

The first sleeve portion can be attached to the first part by screws, and the second sleeve portion can be attached to the first carriage by screws. For example, each of these sleeve portion can be attached to the corresponding part or carriage by just a few screws, for example, one, two, three or four screws. This makes it easy to replace the corresponding sleeve portion, whenever needed.

The machine can comprise a plurality of sets of said first sleeve portion and said second sleeve portion, at least one of said sets being adapted to a different type of connecting rod than another of said sets. That is, one set comprising a first sleeve portion and a second sleeve portion can be adapted to a certain diameter of the big bore, and another set can be adapted to a different diameter of the big bore. Thereby, the machine can be adapted for the production of different products by replacing one of said sets with another of said sets.

The second positioning element can comprise a centering pin, attached to said second carriage. A centering pin is a simple means for fixing the position of the small end of the connecting rod, by letting it penetrate the small bore.

The machine can further include two additional positioning elements mounted on said second carriage and arranged for biasing the big end of the connecting rod towards the first part. These additional positioning elements can help to clamp the connecting rod into its position on the second part, in that they tend to push the connecting rod away from the second positioning element, such as the centering pin. Thereby, even if the diameter of the small bore is larger than the diameter of the centering pin, so that there is some play, the additional positioning means can assure that there is tension in the rod and that the position of the connecting rod with regard to the centering pin is well-defined.

The machine can further include a drive device arranged for displacing the second carriage, for example, with regard to the first carriage. For example, this drive device can serve to bias the second carriage towards a loading position for loading the connecting rod into the machine.

The second carriage can be slidably arranged within the first carriage. That is, the first carriage can make up a frame portion with an opening, wherein the second carriage can be arranged so that it can slide forwards and backwards within said opening.

The first positioning elements can be arranged to be inserted into screw bores of the connecting rod, at the big end of the connecting rod, that is, in the bores that are used to screw the cap part onto the rod part after cracking.

The first positioning elements can be arranged to bias the connecting rod towards the second part. That is, the first positioning elements can be arranged to push the connecting rod towards the proximal position, and, when the machine has a sleeve as described above, thus biases the cap part of the connecting rod towards the first sleeve portion, preferably so that it is in contact with said first sleeve portion when the cracking operation begins.

The first positioning elements can include fluid outlets for ejecting a fluid. That is, these fluid outlets can eject compressed air or any other fluid, which can help to clean the crack surfaces after cracking, removing loose parts. As they are housed within the screw bores of the connecting rod, the fluid outlets can be placed very close to the cracking surfaces, for efficient removal of loose particles.

Said fluid outlets can be placed inside the screw bores so as to be positioned where cracking takes place. That is, when the first positioning elements are inserted into the screw bores, once they reach their end position, the fluid outlets are placed in the area where the connecting rod has been notched and where cracking will take place. In this way, once cracking takes place, the fluid that exits the fluid outlets will impinge on the crack surfaces of the cap part and rod part, and help to remove loose particles.

The machine can further comprise a plurality of fluid outlets for a cleaning fluid, arranged in said first part and/or in said second part. These fluid outlets can additionally help to remove loose particles.

As indicated above, the machine according to the invention comprises an electro press with a servomotor for actuating the expandable element. In this technical field, traditionally, the expandable elements have been actuated by mechanical plungers and, more frequently, by hydraulic systems. The hydraulic systems have been considered to work well and to be generally reliable. However, it has been found that an electro press can imply certain advantages. For example, it is in many aspects cleaner, and can facilitate compliance with environmental regulations, such as ISO 14000. Also, stability and control of the process can be enhanced. An electro press can operate with a servomotor, which can be easily and reliably controlled. Parameters such as force, speed, position, etc., can be easily controlled. Electro presses are available that provide a reliable control of these parameters without the need for a large amount of sensors; contrarily, hydraulic systems require sensors to verify speed, force, position, etc. The electro press can be arranged to operate with a force in the range of, for example, 500N to 120 kN.

A further advantage involved with the use of an electro press is that operation of the machine will depend less on external factors such as temperature. The operation of a hydraulic system can, to a large extent, be influenced by temperature, as this influences the viscosity of the fluid of the system. Thus, performance can vary with temperature. This drawback is at least partly avoided when using an electro press instead of the traditional hydraulic actuator.

Also, the use of an electro press can imply a reduced energy consumption if compared to a hydraulic or pneumatic system.

An electro press can typically operate with a repeatability in the order of +/−0.005 mm. This degree of repeatability can reduce the need to perform calibrations when adapting the machine to, for example, produce a new kind of connecting rod.

In some embodiments of the invention, the positioning elements include first positioning elements arranged to be applied against the big end of the connecting rod (for example, biased or abutted against said big end at the screw bores of said big end, or even inserted into said screw bores, that is, into the bores that are used to screw the cap part onto the rod part after cracking), preferably at the cap part end of said connecting rod (this makes the arrangement more flexible; it could be possible to bias the first positioning elements against the big end, for example, against the screw bores of said big end, also from the other end of the big bore, that is, at the end that is closer to the small end, but then it would not be possible to use the arrangement with connecting rods in which the screw bores are open only at the cap end of the connecting rod; thus, providing said first positioning means to be inserted at or from the cap part end enhances flexibility of the machine and its use for a large variety of products). Said first positioning elements comprise two first positioning elements, each of said two first positioning elements being displaceable laterally (or horizontally; the lateral direction can preferably be in the horizontal direction) so as to adjust the position of the first positioning elements to the distance between the screw bores of the connecting rod. In this way, the machine can be used for machining different kinds of connecting rods, featuring different distances between the screw bores at the big end.

Each of said first positioning elements can be arranged to selectively adopt one of a plurality of predefined positions in a lateral (or horizontal) direction, so as to adapt the machine to a selected one of a plurality of predefined distances between said screw bores. This makes it easy to rapidly switch between the production of different connecting rods: the positioning elements are simply moved laterally to adopt the predefined lateral position that corresponds to the new kind of connecting rod to be manufactured.

One of said first positioning elements can be arranged on one first positioning carriage and another one of said first positioning elements can be arranged on another first positioning carriage, said first positioning carriages being laterally (or horizontally) displaceable so as to displace said first positioning elements between said predefined positions. Thereby, by displacing these carriages, for example, along horizontal guides associated with a fixed part or frame of the machine, the first positioning elements can be selectively put into one or another of said predefined positions.

Each of said first positioning carriages can be provided with a plurality of first coupling means arranged to interact with second coupling means associated to a fixed part or frame of the machine (this fixed part of the machine can be part of, or fixed to, said first part of the machine), so that by coupling said second coupling means with said first coupling means the respective first positioning carriage is blocked in a specific position, wherein each of said first coupling means corresponds to one of said predefined positions. Thus, by selecting a specific one of said first coupling means and coupling it to said second coupling means, the first positioning carriage is blocked in a position so that the corresponding first positioning element is blocked in a specific one of said predefined positions.

Said first coupling means can comprise a plurality of openings or bores, and said second coupling means can comprise at least one blocking element arranged to be inserted into a selected one of said openings, so as to block lateral movement of the corresponding first positioning carriage. Each of said openings can correspond to a respective one of said predefined positions. Thus, by inserting the blocking element into one or another of said openings, the corresponding first positioning element is blocked in one or another of said predefined positions.

Said openings can be distributed in the vertical direction or in a direction perpendicular to the lateral direction. It can sometimes be preferred that the openings are larger than the difference between the different predetermined positions, and it can thus be preferred to place the openings at different heights so as to prevent that one of the openings physically overlaps with another opening. Also, this distribution in height can be advantageous in order to facilitate selection of the opening into which the blocking element is to be inserted.

Said blocking element can be displaceable in the vertical direction so as to be inserted into a selected one of said openings, so as to position the corresponding first positioning element in a selected one of said predefined positions. This facilitates an easy adaptation of the machine to the manufacture of a selected kind of connecting rod, having a certain distance between the screw bores at the big end of the rod: the adaptation is performed by placing the blocking element at the vertical position corresponding to this rod—which can be marked or labeled on the machine—and introducing it into the corresponding opening, for example, by screwing, by using a hand-wheel, or similar.

The blocking element associated to one of said first positioning carriages and the blocking element associated to the other one of said positioning carriages can be joined by a joining structure so that they are jointly moveable in the vertical direction (for example, along a vertical guide), said joining structure being associated with blocking means for blocking said joining structure (11D) at a certain height (for example, by inserting a pin into an opening or bore). This can be advantageous as it allows for a simple positioning of the blocking elements in the vertical direction, both at the same height, thereby selecting the openings or bores into which the blocking elements are to be inserted, and thus a specific distance between the first positioning elements.

Each of said blocking elements can have a tip portion the diameter of which decreases towards a tip end of said blocking elements. For example, the tip can be beveled, conical and/or frusta-conical, arranged to be inserted into said openings. This can substantially facilitate the change of position of said first positioning elements: the blocking element is placed in correspondence with one of said openings, so that the tip thereof enters said opening. Even if said blocking element is not perfectly centered with regard to said opening, the tip will still enter said opening and, due to its shape, during insertion into said opening it will displace the carriage laterally, if necessary, so as to assure correct centering. The size of the blocking element can be selected so that, once it has been inserted into the opening to a blocking position, it fits snugly in said opening.

The orthogonal projection of each one of said openings of a first positioning carriage on a horizontal axis can overlap with the orthogonal projection of each of the other openings of said first positioning carriage on said horizontal axis, by more than 50%. This can facilitate insertion of the blocking element when switching from one opening to another.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures:

FIGS. 8A and 8B are schematic lateral views in cross section of a first positioning carriage and associated equipment, illustrating how a carriage is blocked into position.

DETAILED DESCRIPTION

Figure 1:
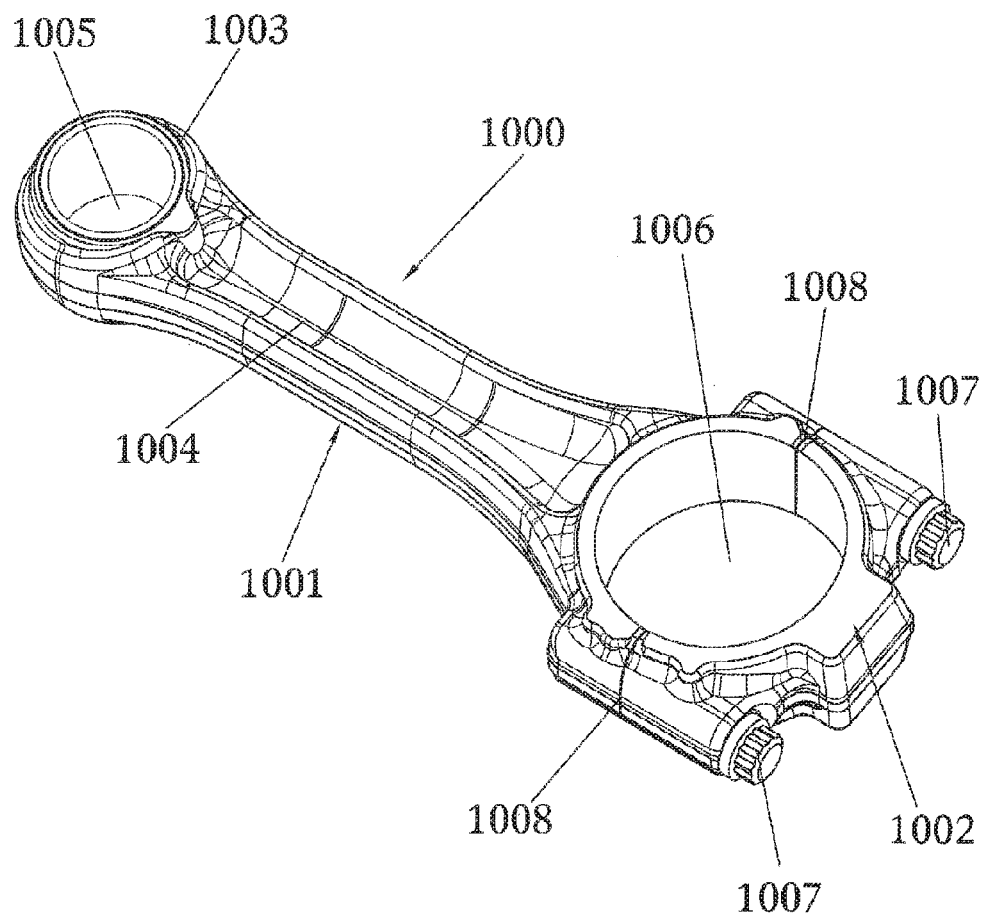
FIG. 1 illustrates an example of a connecting rod.
Figure 2A:
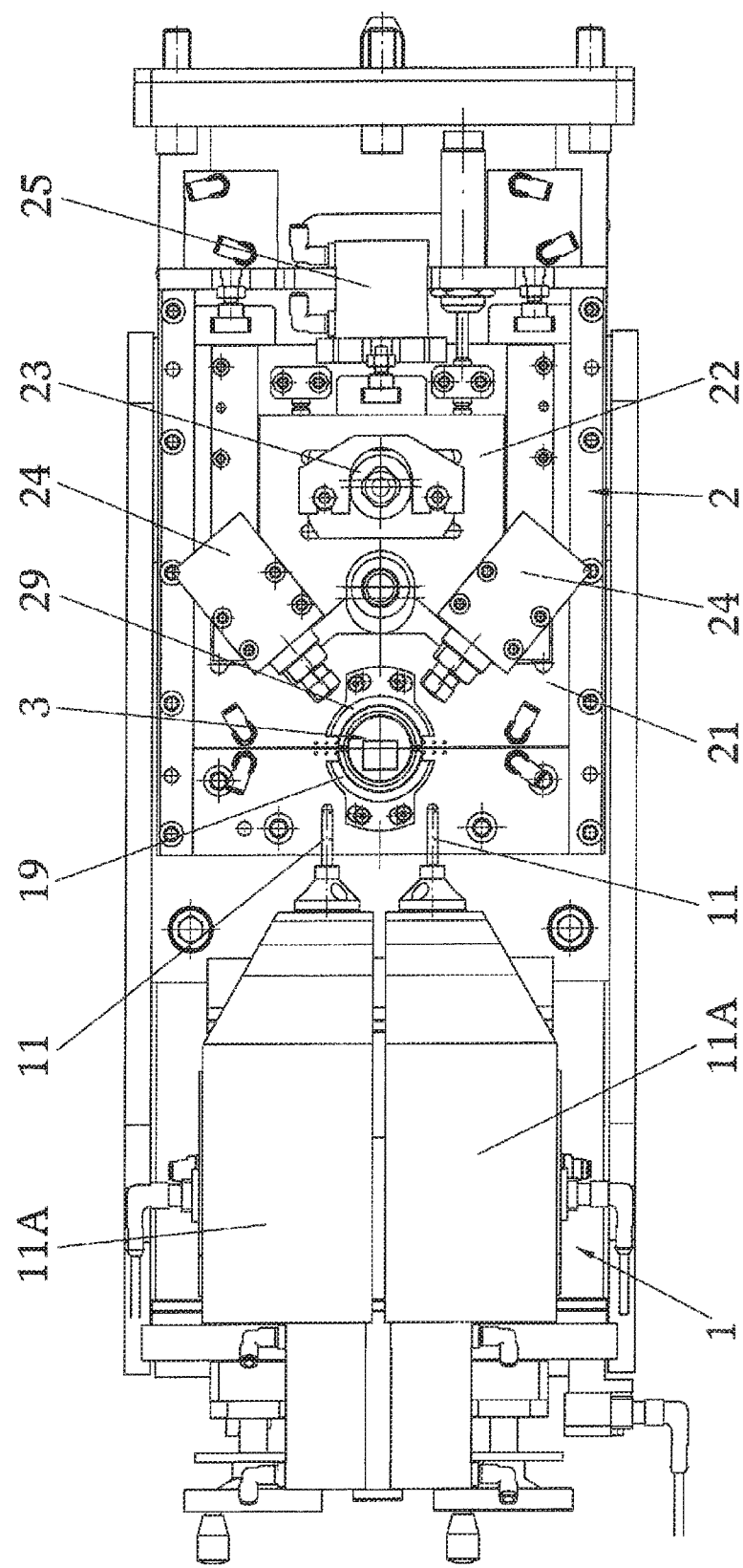
FIGS. 2A and 2B are two top views of a machine according to an embodiment of the invention, without and with a connecting rod to be cracked, respectively.
Figure 2B:
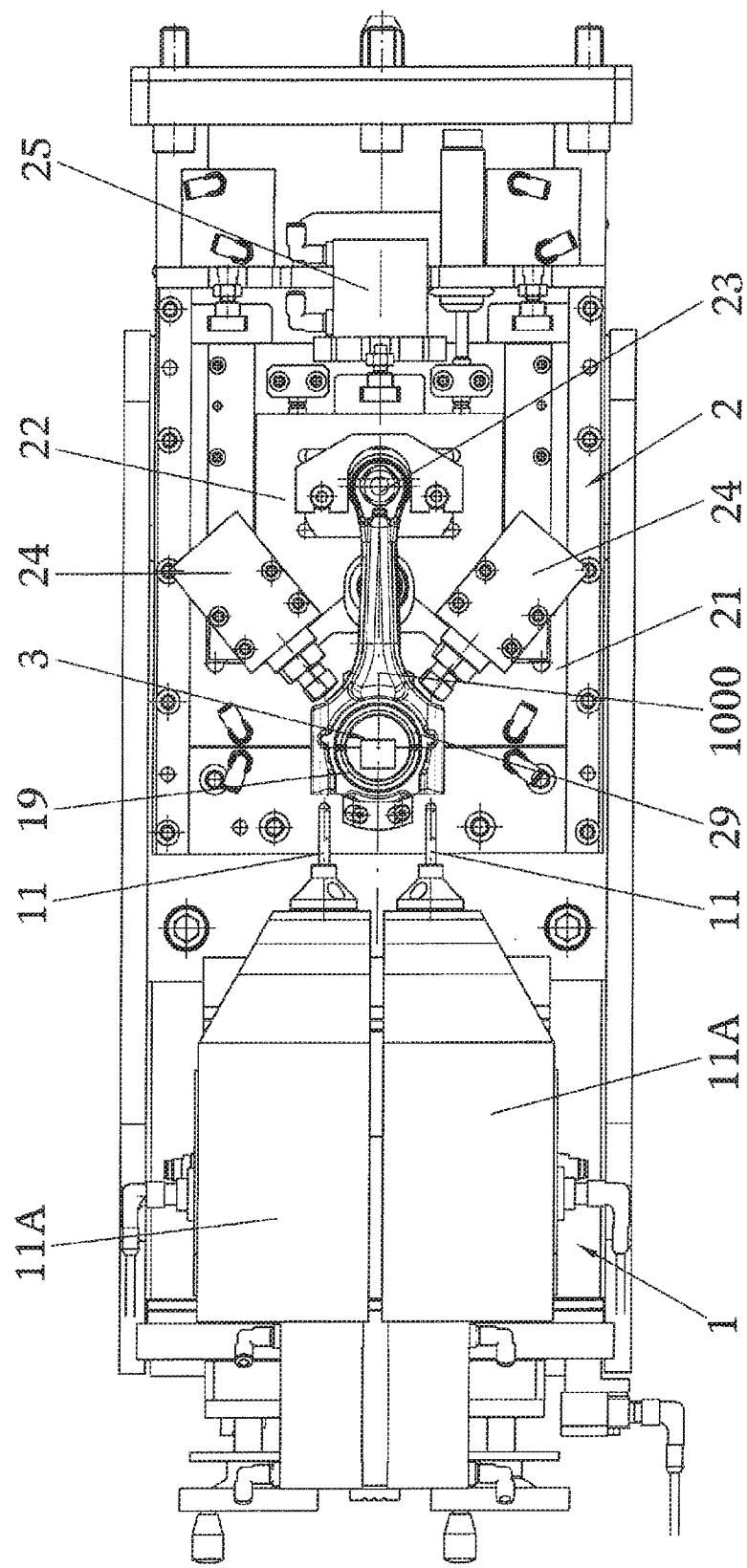

FIGS. 2A and 2B schematically illustrate a machine according to the present invention, including a basic machine frame including a first, fixed, part 1, in relation to which a second part 2, comprising a first (main) carriage 21, is slidably mounted, between a proximal position and a distal position. The second part 2 further comprises a second carriage 22, which is slidably mounted within the first carriage, so that it can move forwards and backwards within said first carriage 21. An actuator or drive device 25 is provided on the first carriage 21, to controllably displace the second carriage 22 within the first carriage, for example, so as to bias the second carriage against stops 26 in a loading phase of the operation of the machine.

Figure 3:
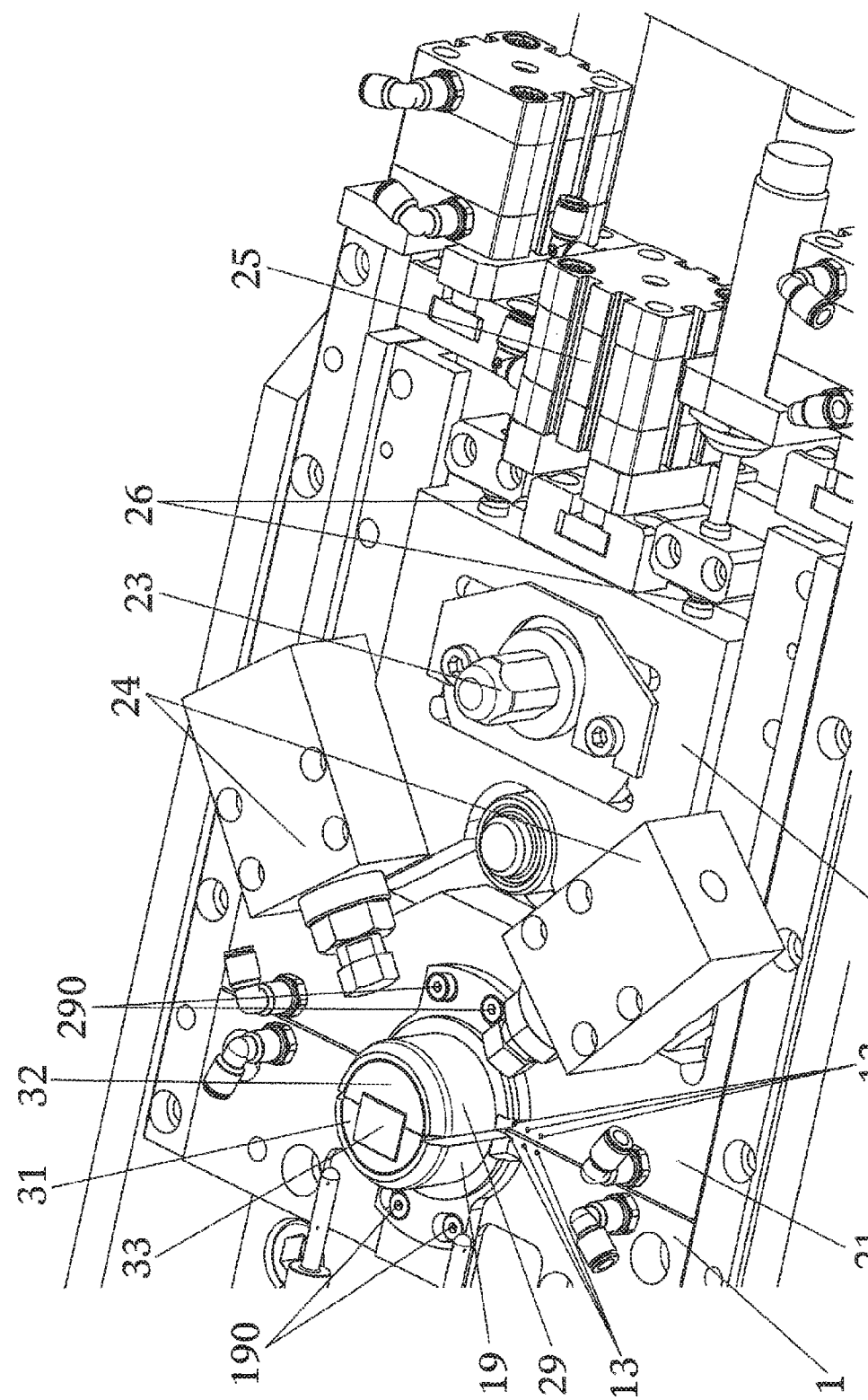
FIG. 3 is a perspective partial view of the machine of FIGS. 2A and 2B.
Figure 5:
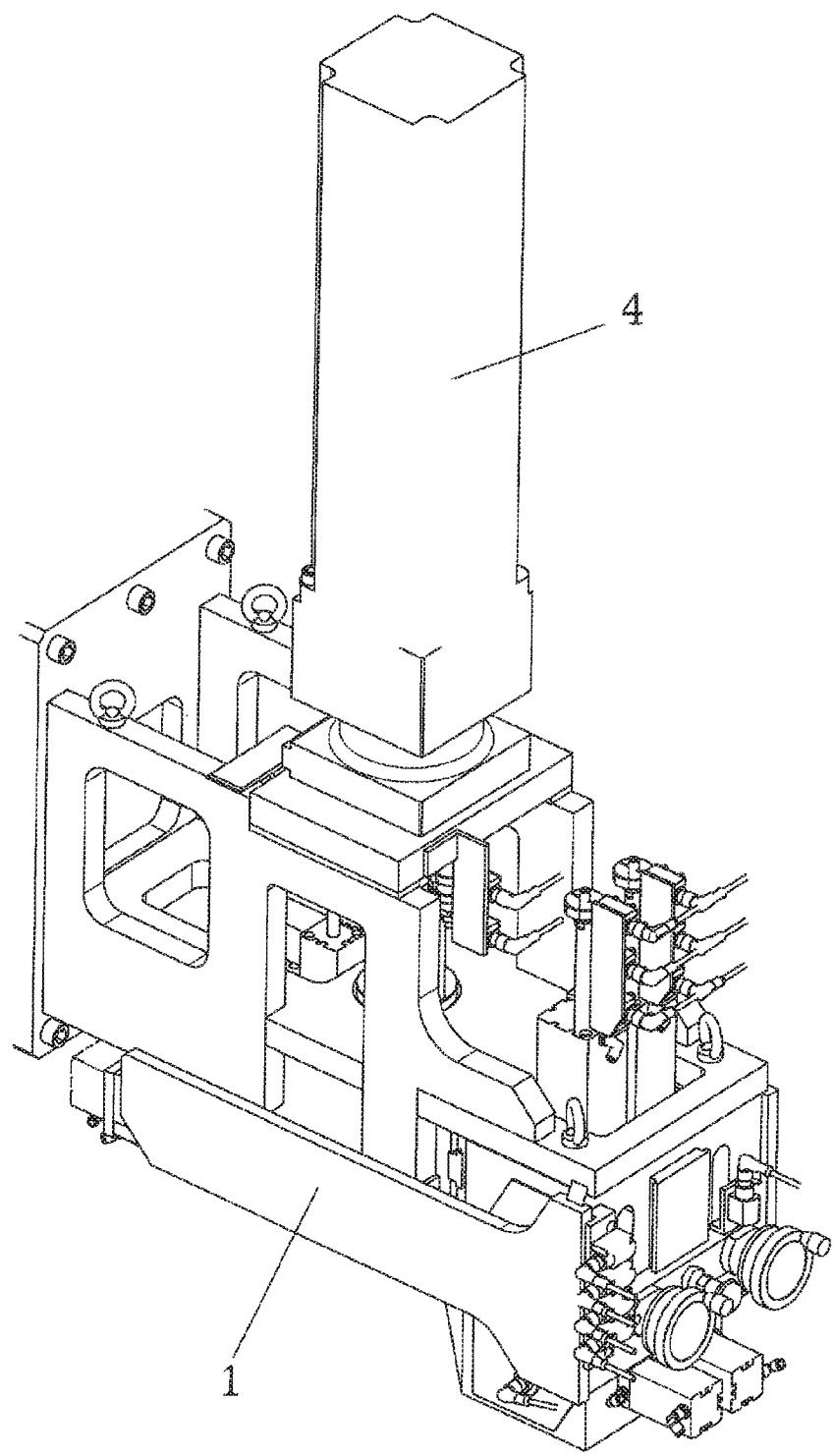
FIG. 5 is a perspective view of the machine, including the actuator of the expandable element.

As can be best seen in FIG. 3, a first half-shell or sleeve portion 19 is attached to the first part 1 by screws 190, and a second half-shell or sleeve portion 29 is attached to the first carriage 21 by screws 290. These two sleeve portions 19 and 29 form, when together (that is, when the first carriage is in the proximal position, as illustrated in FIG. 3), a protrusion, which will enter the big bore of the connecting rod 1000 when the rod is mounted in the machine for cracking (as shown in FIG. 2B). These sleeve portions form part of an expanding element 3, which further comprises two expander mandrel halves 31 and 32, positioned within the sleeve or cylinder formed by the first 19 and second 29 sleeve portions. One of these expander mandrel parts 31 is attached to the first part 1 of the machine, and the other expander mandrel part is attached to the first carriage 21. The expander mandrel halves are arranged to be separated by an advancing movement of a cleaving wedge 33. The cleaving wedge can be actuated by any suitable actuation means, such as a conventional hydraulic actuator often used in this kind of machines, although it can sometimes be preferable to use an electro press 4, as schematically illustrated in FIG. 5.

Figure 4:
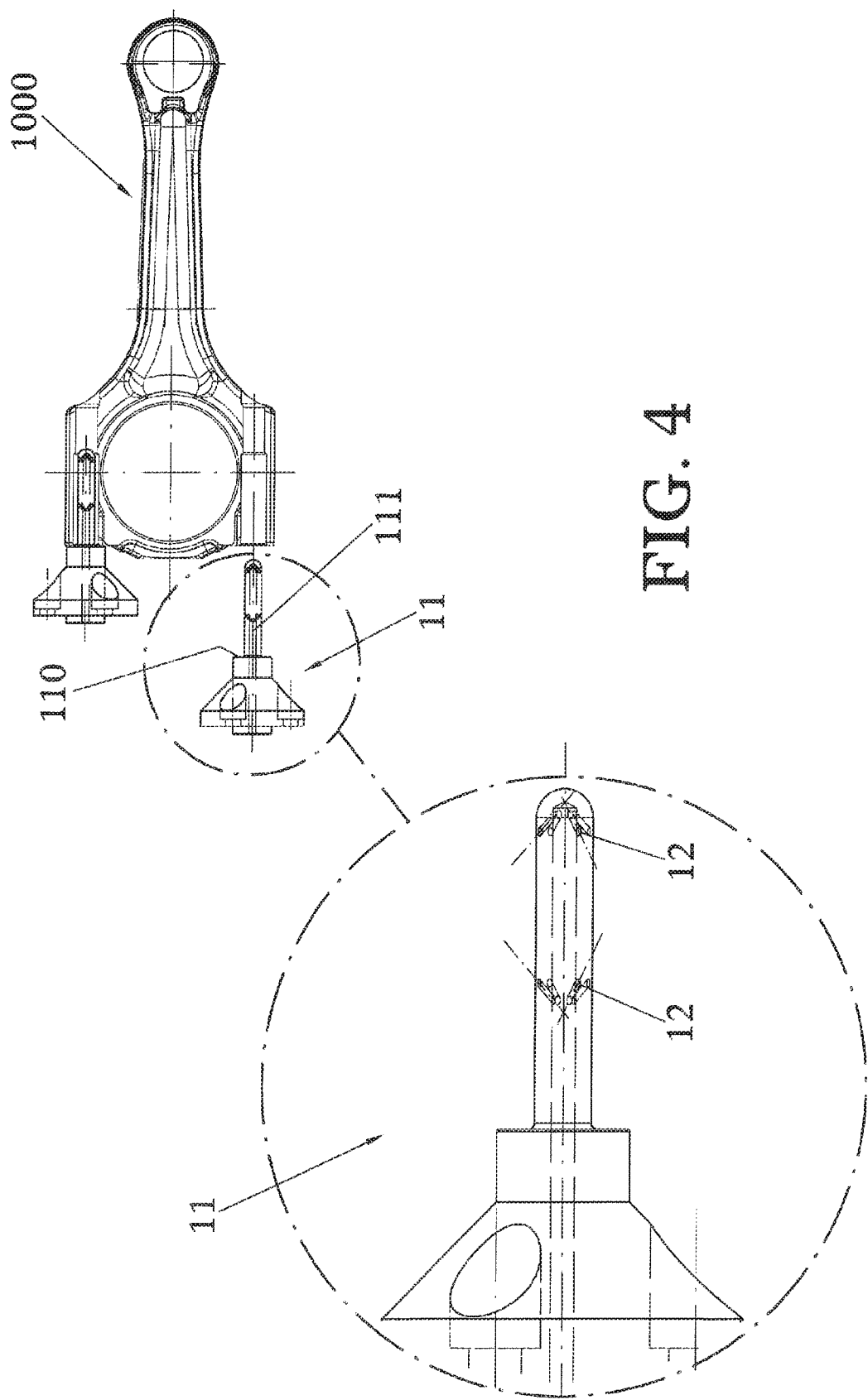
FIG. 4 schematically illustrates the first positioning elements.

In addition to the sleeve made up by the first 19 and second 29 sleeve portions, there are several further positioning means for positioning the connecting rod in the machine. First positioning means are arranged on the first part 1 and include first positioning elements 11, which are arranged to be displaced forwards and backwards by corresponding actuators housed in the carriages 11A (referred to herein as first positioning carriages), mounted on the first part 1 of the machine. These first positioning elements 11 are arranged to be at least partially inserted into the screw bores of the connecting rod that are used to house the screws that attach the cap part to the rod part after cracking, as schematically illustrated in FIG. 4. These first positioning elements include a spindle part or portion 111 which is inserted into said screw bores from the cap part end of the connecting rod, and a contact surface 110 or abutment portion which, when the positioning elements are brought towards the connecting rod during operation of the machine, abuts against the cap portion of the connecting rod and thus biases it towards the first sleeve portion 19, establishing contact with said first sleeve portion 19. The spindle parts thus become fully inserted into the screw bores. As illustrated in FIG. 4, the spindle parts 111 include fluid outlets 12 and, during operation of the machine, a cleansing fluid can be provided to constantly or intermittently flow out of these outlets 12. These outlets are positioned so that when cracking takes place, fluid from these fluid outlets 12 will impinge on the crack surfaces of the cap part and/or the rod part, so as to help to remove loose particles.

On the other hand, as best shown in FIG. 3, further fluid outlets 13 are provided in the first part 1 and in the first carriage 21, adjacent to the area where the two sleeve parts 19 and 29 meet, so as to provide further fluid to the crack surfaces when cracking take place, so as to help to remove loose particles.

The fluid can be, for example, compressed air.

Further positioning means for positioning the connecting rod for cracking comprise a centering pin 23, arranged to fit into the small bore 1005 of the connecting rod, and two additional positioners 24 arranged to bias the large end of the connecting rod away from the centering pin 23. The centering pin 23 and the additional positioners 24 are arranged on the second carriage 22 which, as explained above, is moveable within the first carriage 21. The purpose of this floating arrangement of the positioning means is to reduce the risk for excessive stresses or forces that may damage or deteriorate the connecting rod during an initial phase of the cracking operation.

In accordance with the present embodiment, when the connecting rod is to be placed in the machine, the second carriage 21 is biased against the stops 26 by the actuator 25, and the connecting rod is inserted into the machine, so that the centering pin 23 enters the small bore of the connecting rod. The centering pin 23 can be displaced towards the first part 1 by external forces, so as to facilitate a correct positioning of the connecting rod, which is placed so that the sleeve 19+29 enters the large bore 1006 of the connecting rod.

Once the connecting rod has been positioned, the first positioning elements 11 are brought forwards (that is, towards the connecting rod), the spindles 111 enter the screw bores, and the contact surfaces 110 abut against the cap portion of the connecting rod, so that the connecting rod is firmly biased against, and in contact with, the first sleeve portion 19; both the actuators of the first positioning elements (housed in the first positioning carriages 11A) and the actuator 25 thus tend to bias the connecting rod towards the first sleeve portion 19. This gives rise to a small separation between the inner surface of the large bore of the connecting rod, and the second sleeve portion 29.

When the cleaving wedge 33 starts to advance, the second sleeve portion 29 is forced to move away from the first sleeve portion 19, towards the small end of the connecting rod; the first carriage 21 on which the second sleeve portion 29 is mounted will likewise move. If the small end of the connecting rod had been fixed to the first carriage 21, tensions would have occurred in the connecting rod, as its large end is prevented from moving by the first sleeve portion 19. However, as the connecting pin 23 is mounted on the second carriage 22, which is floating with regard to the first carriage 21, the connecting rod can maintain its original position without substantial stresses, in spite of this initial movement of the first carriage 21. Thereby, these tensions and stresses do not occur or are, at least, substantially reduced.

Once the second sleeve portion 29 abuts the inner surface of the large bore of the connecting rod, cracking takes place in the normal way, in accordance with notches or similar, previously made by, for example, laser, in a conventional way. After cracking, the rod part and the cap part are separated, and the rod part is carried away from the cap part due to the movement of the first carriage 21.

FIG. 5 schematically illustrates the use of an electro press instead of the conventionally used hydraulic press. The advantages involved have been described above.

Figure 6:
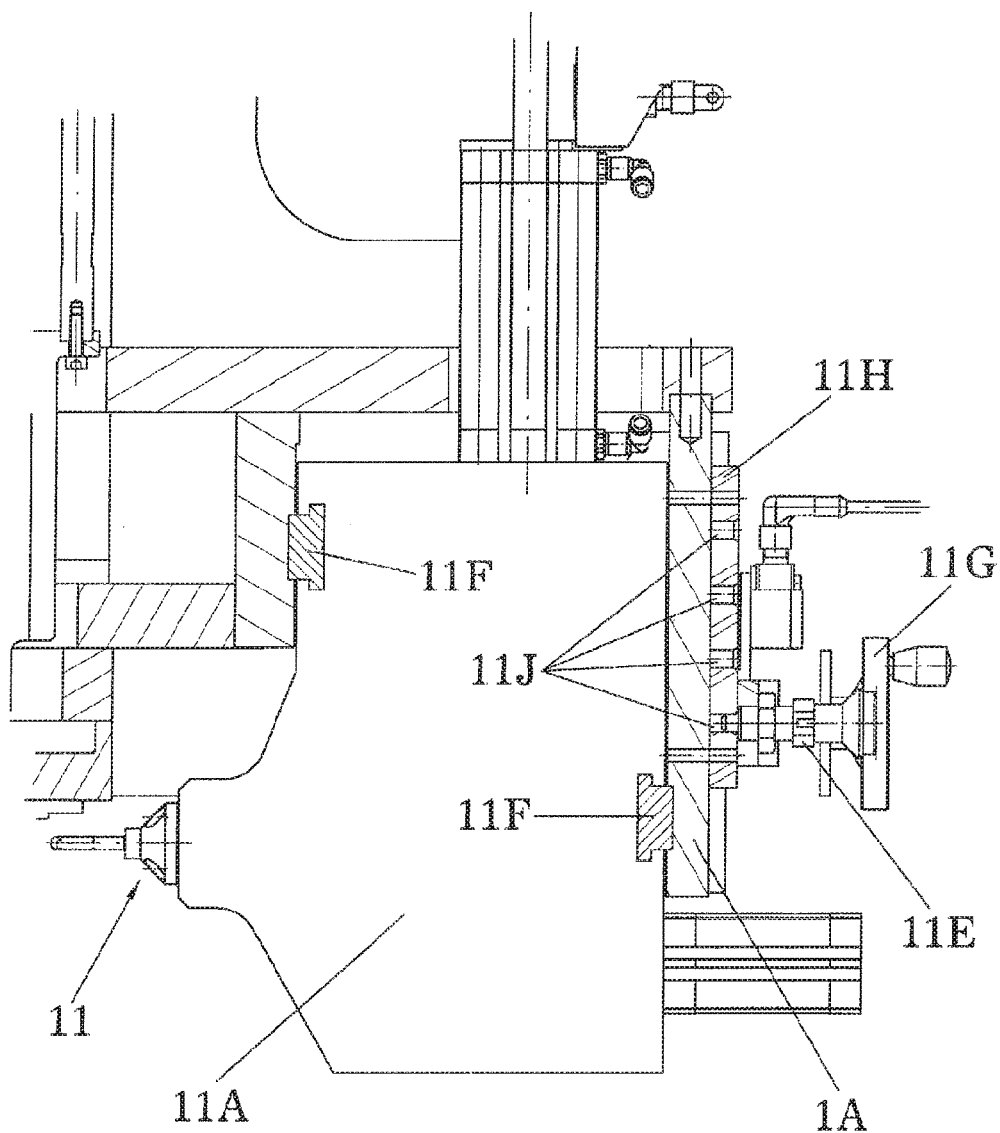
FIG. 6 is a lateral view in cross section of a first positioning carriage and associated equipment.

In order to adapt the machine to different kinds of connecting rods to be produced, it can be necessary to change the distance between the first positioning elements 11, so as to adapt this distance to the distance between the screw bores at the cap end of the connecting rod to be produced, so that the spindle portions 111 can be inserted into said screw bores or, if the first positioning elements do not include this kind of spindle portions, the contact surface 110 will abut against the big end of the connecting rod at a desired point or area of said big end. In order to facilitate this, the first positioning elements 11 can be placed in first positioning carriages 11A that are arranged laterally displaceable along horizontal guides 11F, as shown in FIG. 6. These guides 11F are associated to a fixed part 1A of the machine, which can be fixed with regard to, for example, the first part 1 of the machine. Hand-wheels 11G are mounted to said fixed part 1A for displacing blocking elements 11C used to block the first positioning carriages in selected positions, each of said selected positions corresponding to a predetermined position of the corresponding first positioning element 11. Thus, by placing the first positioning carriages at a selected specific position, the machine can be adapted to manufacture a specific kind of connecting rod, having a specific distance between the screw bores.

Figure 7:
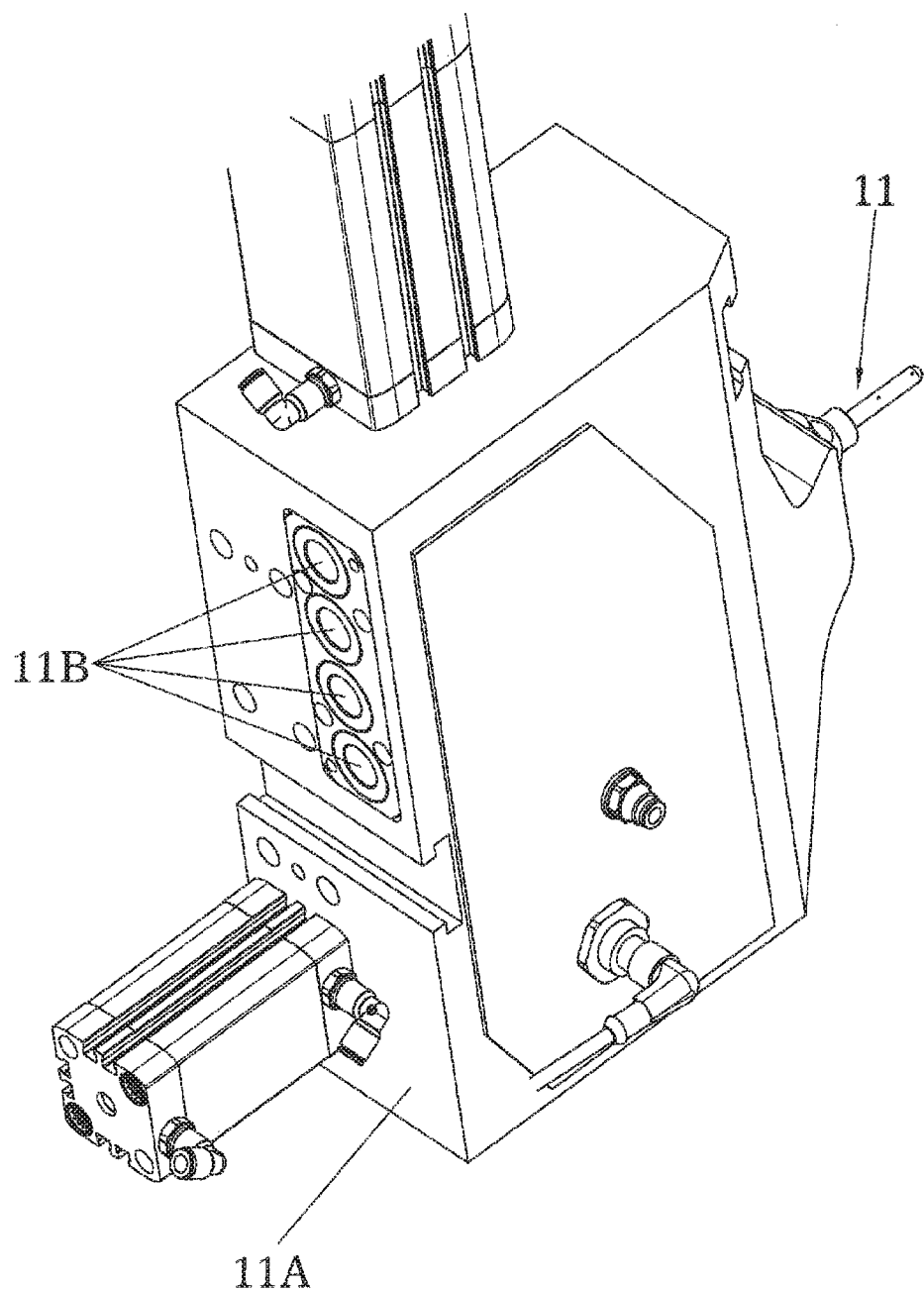
FIG. 7 is a perspective view of a first positioning carriage.

FIG. 7 illustrates how a first positioning carriage is provided with a plurality of openings 11B, distributed in the vertical direction. Each of said openings has a specific position also in the lateral or horizontal direction (at a first look, it may seem that the openings 11B are all in the same position along the horizontal axis, but this is only due to the fact that the openings are substantially larger than the difference in their position in the horizontal direction; the difference between the distances of the screw bores of different connecting rods can be rather small, so that the lateral displacement of the first positioning carriages needed for adapting the machine to different kinds of connecting rods is often not very big; however, using fairly large openings 11B can be preferred; for example, it can be preferred that all of the openings overlap with each other by more than 50% when projected—orthogonally—onto the horizontal axis, as this can facilitate insertion of the blocking element when switching from one opening to another, as will be clear from our discussion below).

Thus, by inserting the blocking element 11C into a selected one of said openings 11B, the carriage 11A can be placed in a specific lateral/horizontal position, corresponding to a specific position of the first positioning element. FIG. 8A shows how the blocking element 11C has been placed at the level of the second opening 11B from above, and by rotating the hand-wheel 11G the blocking element is introduced into this opening, to the position shown in FIG. 8B, where it fits snugly into said opening 11B, thus blocking the carriage 11A in a certain selected lateral position.

As can be seen in FIGS. 8A and 8B, the blocking element 11C has a conical end. FIG. 7 illustrates how the openings 11B all have a size such that they overlap substantially when projected onto the horizontal axis. That is, when displacing the blocking element 11C in the vertical direction so as to change it from having been inserted into one of these openings to be inserted into another one of these openings, the tip of the blocking element will be in correspondence with the new opening, thereby avoiding the need to "manually" displace the carriage laterally to be able to insert the tip into the corresponding opening. Now, when rotating the handwheel so as to introduce the blocking element into the new opening, due to the beveled character of the end and the snug fit between the blocking element 11C and the opening 11B when the blocking element is fully inserted, the advancing movement of the blocking element 11C will displace the carriage 11A laterally to its desired position.

Figure 9:
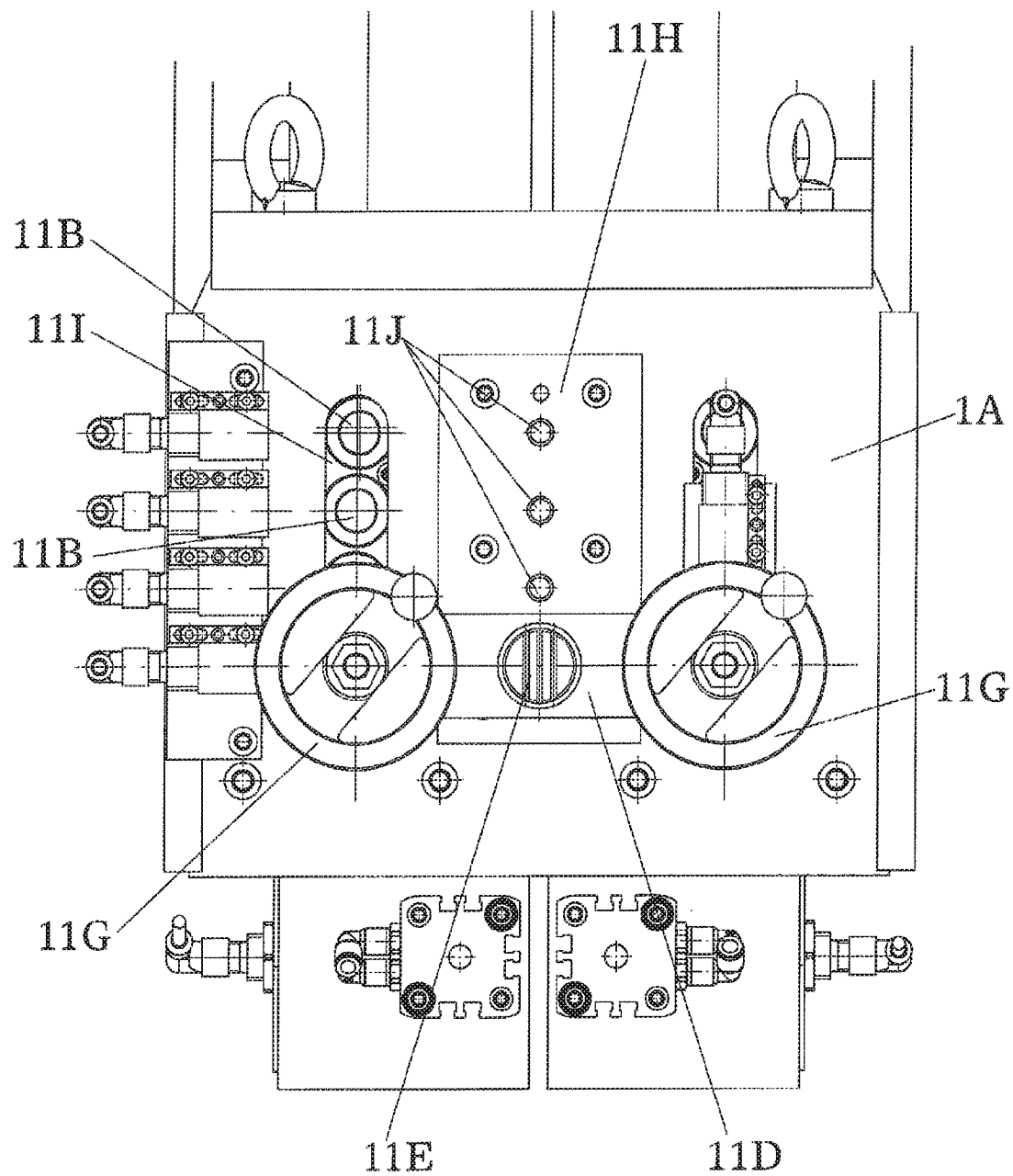
FIG. 9 is a schematic rear view of the part of the machine associated to the first positioning carriages.
Figure 10:
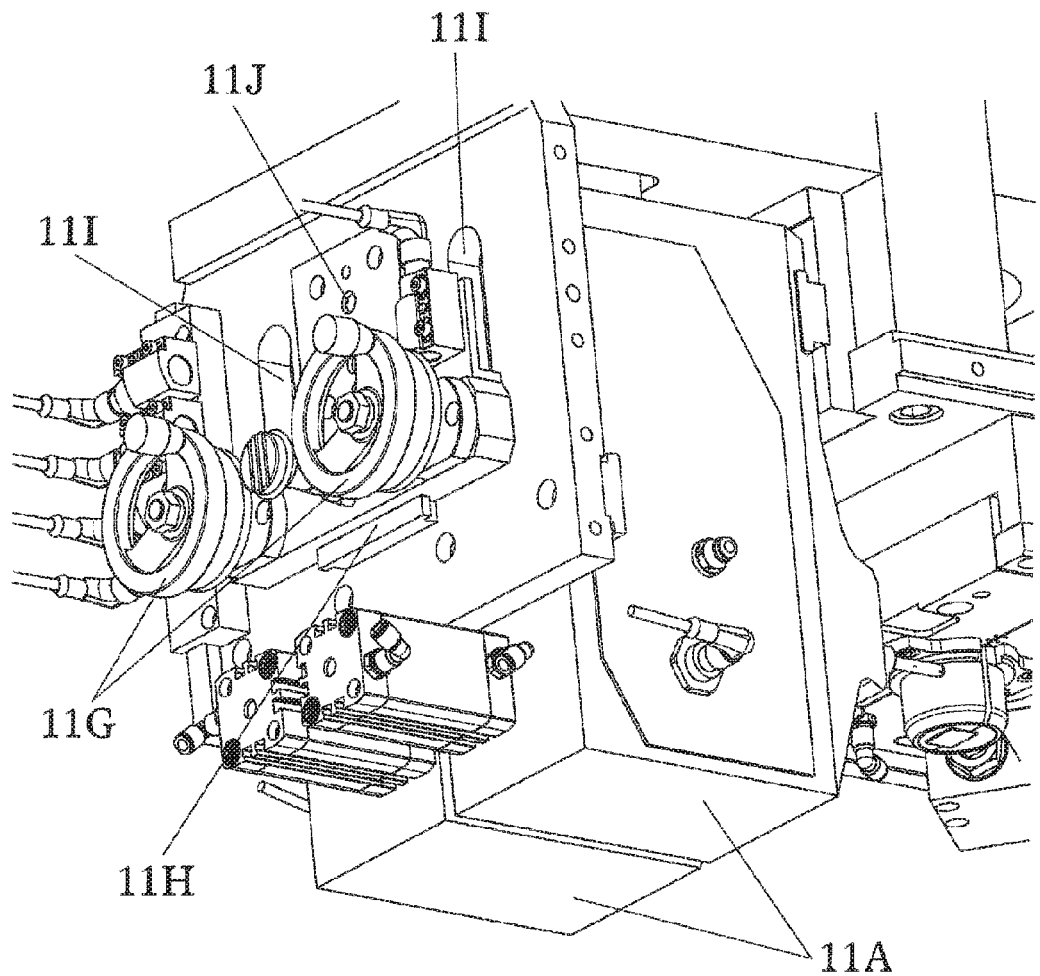
FIG. 10 is a perspective rear view of said part of the machine.

FIGS. 9 and 10 illustrate a vertical guide 11H for the joining structure 11D by which the blocking elements 11C corresponding to the two carriages 11A are joined to each other, together with their associated hand-wheels 11G. This guide is mounted at the rear part of the fixed part 1A of the machine, and includes a plurality of openings 11J, each of said openings corresponding to one of the openings 11B in the carriages 11A. It can be seen how the openings 11B in the carriages 11A are visible from the rear part through the slots 11I through which the blocking elements 11C penetrate (cf. also FIGS. 8A and 8B).

In the position shown in FIG. 9, the blocking elements 11C are associated to the lowermost openings 11B of the two carriages 11A. To change the machine for the manufacture of a connecting rod having a different distance between the screw bores at the cap end, for example, the distance corresponding to the second opening 11B from above, the operator of the machine will first move the hand-wheels 11G so as to withdraw the blocking elements 11C out of the openings 11B. Next, the operator will pull the blocking means 11E backwards, so that a corresponding pin is drawn out of the lowest ones of the openings 11J. Next, the operator will, for example, manually, lift the whole blocking arrangement, including the joining structure 11D, the hand-wheels 11G, and the associated blocking elements 11C, until the pin (not shown) of the blocking means 11E reaches the level of the second opening 11J from above, where the operator will let the pin (such as a spring-loaded pin) snap into this opening. This corresponds to the position of FIG. 8A. The operator can now simply turn the hand-wheels to introduce the blocking elements 11C into the second openings 11B from above, and during this insertion of the blocking elements into the respective openings 11B, the two carriages 11A are displaced to their new positions, thus positioning the first positioning elements in the correct position for manufacture of the new kind of connecting rod.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A machine for cracking a connecting rod having a small end and a big end, into a rod part and a cap part, said machine comprising:
   positioning elements for positioning said connecting rod in a position for cracking, wherein said positioning elements include first positioning elements arranged to be applied against the big end of the connecting rod, wherein said first positioning elements comprise two first positioning elements, each of said two first positioning elements being displaceable laterally so as to adjust the position of the first positioning elements to the distance between screw bores of the connecting rod; and
   an expandable element comprising two mandrel halves arranged to be separated by displacement of a cleaving wedge, said expandable element arranged to be inserted into a bore in said big end of the connecting rod so as to allow for splitting of said connecting rod into the rod part and the cap part by expanding said expandable element by displacing said cleaving wedge;
   wherein the machine further comprises an electro press with a servomotor for actuating the expandable element by displacing said cleaving wedge, said servomotor being controllable to adapt the displacement of the cleaving wedge, thereby facilitating adaptation of the machine to different kinds of connecting rods for cracking.

2. Machine according to claim 1, wherein the expandable element includes a first sleeve portion attached to said first part, and a second sleeve portion attached to the first carriage, said first and second sleeve portions being arranged to form, when said first carriage is in said proximal position, a protrusion arranged to fit into a big bore in the big end of the connecting rod.

3. Machine according to claim 2, wherein the first sleeve portion is attached to the first part by screws, and wherein the second sleeve portion is attached to the first carriage by screws.

4. Machine according to claim 2, wherein said machine comprises a plurality of sets of said first sleeve portion and said second sleeve portion, at least one of said sets being adapted to a different type of connecting rod than another of said sets.

5. Machine according to claim 1, wherein said positioning elements further comprise at least one second positioning element, and wherein the machine further comprises:
a first part and a second part, said second part being movable with regard to said first part, said first part being arranged to accommodate a cap portion of said big end of said connecting rod, said first part further comprising said first positioning elements arranged to interact with said cap portion,
said second part being arranged to accommodate the small end of said connecting rod, said second part further comprising said at least one second positioning element arranged to interact with the small end of the connecting rod;
wherein
said second part comprises a first carriage which is arranged to be movable with regard to said first part between a proximal position and a distal position, and a second carriage which is arranged to be movable with regard to said first carriage, said second positioning element being provided on said second carriage so as to set the position the small end of said connecting rod with regard to said second carriage.

6. Machine according to claim 5, wherein the second positioning element comprises a centering pin, attached to said second carriage.

7. Machine according to claim 5, further including two additional positioning elements mounted on said second carriage and arranged for biasing the big end of the connecting rod towards the first part.

8. Machine according to claim 5, further including a drive device arranged for displacing the second carriage.

9. Machine according to claim 5, wherein the second carriage is slidably arranged within the first carriage.

10. Machine according to claim 5, wherein the first positioning elements are arranged to be inserted into screw bores of the connecting rod, at the big end of the connecting rod.

11. Machine according to claim 10, wherein the first positioning elements are arranged to bias the connecting rod towards the second part.

12. Machine according to claim 10, wherein the first positioning elements include fluid outlets for ejecting a fluid.

13. Machine according to claim 12, wherein said fluid outlets are placed inside the screw bores so as to be positioned where cracking takes place.

14. Machine according to claim 5, further comprising a plurality of fluid outlets for a cleaning fluid, arranged in said first part and/or in said second part.

15. The machine according to claim 1, wherein each of said first positioning elements is arranged to selectively adopt one of a plurality of predefined positions in a lateral direction, so as to adapt the machine to a selected one of a plurality of predefined distances between said screw bores.

16. The machine according to claim 15 wherein one of said first positioning elements is arranged on one first positioning carriage and another one of said first positioning elements is arranged on another first positioning carriage, said first positioning carriages being laterally displaceable so as to displace said first positioning elements between said predefined positions.

17. The machine according to claim 16, wherein each of said first positioning carriages is provided with a plurality of first coupling means arranged to interact with second coupling means associated to a fixed part of the machine, so that by coupling said second coupling means with said first coupling means the respective first positioning carriage is blocked in a specific position, wherein each of said first coupling means corresponds to one of said predefined positions.

18. The machine according to claim 17, wherein said first coupling means comprise a plurality of openings, and wherein said second coupling means comprises at least one blocking element arranged to be inserted into a selected one of said openings, so as to block lateral movement of the corresponding first positioning carriage, wherein each of said openings corresponds to a respective one of said predefined positions.

19. The machine according to claim 18, wherein said openings are distributed in the vertical direction.

20. The machine according to claim 19, wherein said blocking element is displaceable in the vertical direction so as to be inserted into a selected one of said openings, so as to position the corresponding first positioning element in a selected one of said predefined positions.

21. The machine according to claim 20, wherein the blocking element associated to one of said first positioning carriages and the blocking element associated to the other one of said positioning carriages are joined by a joining structure so that they are jointly moveable in the vertical direction, said joining structure being associated with blocking means for blocking said joining structure at a certain height.

22. The machine according to claim 18, wherein each blocking element has a tip portion the diameter of which decreases towards a tip end of said blocking element, arranged to be inserted into said openings.

23. The machine according to claim 22, wherein the orthogonal projection of each one of said openings of a first positioning carriage on a horizontal axis overlaps with the orthogonal projection of each of the other openings of said first positioning carriage on said horizontal axis, by more than 50%.

* * * * *